United States Patent
Petrangeli et al.

(10) Patent No.: US 9,826,016 B2
(45) Date of Patent: Nov. 21, 2017

(54) FAIR ADAPTIVE STREAMING

(71) Applicants: Koninklijke KPN N.V., The Hague (NL); IMEC VZW, Leuven (BE); Ghent University, Ghent (BE)

(72) Inventors: Stefano Petrangeli, Ghent (BE); Jeroen Famaey, Ghent (BE); Steven Latré, Lokeren (BE)

(73) Assignees: KONINKLIJKE KPN N.V., The Hague (NL); IMEC VZW, Leuven (BE); GHENT UNIVERSITY, Ghent (BE)

(*) Notice: Subject to any disclaimer, the term of this patent is extended or adjusted under 35 U.S.C. 154(b) by 232 days.

(21) Appl. No.: 14/630,174

(22) Filed: Feb. 24, 2015

(65) Prior Publication Data

US 2016/0248835 A1 Aug. 25, 2016

(51) Int. Cl.
H04L 29/06 (2006.01)
H04L 29/08 (2006.01)

(52) U.S. Cl.
CPC ........ H04L 65/608 (2013.01); H04L 65/4092 (2013.01); H04L 65/605 (2013.01); H04L 65/80 (2013.01)

(58) Field of Classification Search
CPC ... H04L 65/608; H04L 65/80; H04L 65/4092; H04L 65/605
See application file for complete search history.

(56) References Cited

U.S. PATENT DOCUMENTS 6,553,376 B1 4/2003 Lewis et al.
9,380,092 B2 * 6/2016 Patel ...................... H04L 65/60
(Continued)

FOREIGN PATENT DOCUMENTS

EP 2 360 923 A1 8/2011
EP 2 605 469 A1 6/2013
(Continued)

OTHER PUBLICATIONS

Huysegems, R., et al., "Session Reconstruction for HTTP Adaptive Streaming. Laying the Foundation for Network-Based QoE Monitoring," Bell-Labs, Alcatel-Lucent, IEEE, 9 pgs., 2012.
(Continued)

*Primary Examiner* — Abdullahi E Salad
(74) *Attorney, Agent, or Firm* — Hamilton, Brook, Smith & Reynolds, P.C.

(57) ABSTRACT

A method and system for enabling a plurality of adaptive streaming client devices to share network resources includes a network node monitoring chunk request messages of client devices configured to select a quality level of a chunk from a plurality of quality levels and to request a media server for transmission of a chunk of the selected quality level. The quality level in a monitored chunk request message of a client device is used to estimate local quality information associated with the quality performance of the client device. Global quality information, determined based on the estimated local quality information associated with the client devices, and being indicative of the global quality performance of the client devices, is sent to the client devices. The client devices are configured for selecting a quality level for a subsequent chunk based on the global quality information and based on local quality information determined by the client during or after rendering media data of a requested chunk such that deviations between the global quality information and the local quality information is minimized.

16 Claims, 8 Drawing Sheets

(56) References Cited

U.S. PATENT DOCUMENTS

| | | | |
|---|---|---|---|
| 2003/0097443 | A1 | 5/2003 | Gillet |
| 2003/0142670 | A1 | 7/2003 | Gould et al. |
| 2004/0049579 | A1 | 3/2004 | Ims |
| 2005/0265345 | A1* | 12/2005 | Chen .................. H04L 29/06 370/392 |
| 2007/0242666 | A1 | 10/2007 | Barrett |
| 2008/0189429 | A1 | 8/2008 | DaCosta |
| 2009/0113024 | A1 | 4/2009 | Verma |
| 2011/0082924 | A1* | 4/2011 | Gopalakrishnan .. H04L 65/4084 709/223 |
| 2011/0231519 | A1 | 9/2011 | Luby |
| 2012/0082158 | A1 | 4/2012 | Reddy |
| 2012/0124179 | A1 | 5/2012 | Cappio |
| 2012/0233247 | A1* | 9/2012 | Ashrafi ................ H04W 4/18 709/203 |
| 2012/0265856 | A1* | 10/2012 | Major ............. H04N 21/2225 709/219 |
| 2012/0290644 | A1 | 11/2012 | Gabin et al. |
| 2013/0013803 | A1* | 1/2013 | Bichot .............. H04L 65/1046 709/231 |
| 2013/0095806 | A1 | 4/2013 | Salkintzis et al. |
| 2013/0166868 | A1* | 6/2013 | Jarnikov .......... H04N 21/23892 711/162 |
| 2013/0304848 | A1* | 11/2013 | Lyle .................... H04L 65/80 709/217 |
| 2013/0346590 | A1* | 12/2013 | Scurtu ................ H04L 65/602 709/224 |
| 2014/0095670 | A1* | 4/2014 | Ozgur .............. H04W 52/0258 709/219 |
| 2014/0304377 | A1* | 10/2014 | Andersson ......... H04L 65/1083 709/219 |
| 2015/0207846 | A1 | 7/2015 | Famaey et al. |
| 2015/0358373 | A1 | 12/2015 | Famaey et al. |
| 2017/0171287 | A1 | 6/2017 | Famaey et al. |

FOREIGN PATENT DOCUMENTS

| | | |
|---|---|---|
| EP | 2 723 033 A1 | 4/2014 |
| GB | 2472985 A | 3/2011 |
| WO | WO 2011/059286 A3 | 5/2011 |
| WO | WO 2011/101371 A1 | 8/2011 |
| WO | WO 2012/123773 A1 | 9/2012 |
| WO | WO 2013/098319 A1 | 7/2013 |
| WO | WO 2013/107502 A1 | 7/2013 |
| WO | WO 2014/02330 A1 | 2/2014 |

OTHER PUBLICATIONS

Grace Period Disclosure: Petrangeli, Stefano, et al., "A Multi-Agent Q-Learning-based Framework for Achieving Fairness in HTTP Adaptive Streaming," IEEE, Network Operations and Management Symposium (NOMS), 9 pgs., May 5-9, 2014.

Akhshabi, Saamer, et al., "What Happens When HTTP Adaptive Streaming Players Compete for Bandwidth," NOSSDAV 12, 6 pgs., Jun. 7-8, 2012.

Jiang, Junchen, et al., "Improving Fairness, Efficiency, and Stability in HTTP-Based Adaptive Video Streaming With Festive," IEEE, ACM Transactions on Networking, vol. 22, No. 1, pp. 326-340, Feb. 2014.

Cleays, et al., "Design of a Q-Learning Based Client Quality Selection Algorithm for HTTP Adaptive Streaming," Proceedings of the Adaptive and Learning Agents Workshop, part of AAMAS 2013, May 2013.

Mueller, C., et al., "A Proxy Effect Analysis and Fair Adatpation Algorithm for Multiple Competing Dynamic Adaptive Streaming Over HTTP Clients," pp. 1-6, Visual Communications and Image Processing (VCIP) (Nov. 2012).

Bouten, N., et al., "QoE-driven in-network optimization for Adaptive Video Streaming Based on Packet Sampling Measurements," Computer Networks, 81:96-115 (2015).

Stockhammer, T., Proposal, "CE-Sand: HTTP Communication Channel" MPEG Meeting, Motion Picture Expert Group or ISO/IEC JTC1/SC29/WG11, pp. 1-14 (Oct. 2014).

Van Der Hooft, J., et al., Parameters Self-Learning Optimization of Adaptive Video Streaming, Retrieved from the Internet: URL:http://buck.ugent.be.fulltxt.RUG01/002/153/683/rug01-002153683_2014_0001_AC.pdf (Oct. 2014).

3GPP TS 26.247, 3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH), 3GPP Standard; 3GPP TS 26.247, 3rd Generation Partnership Project, vol. SA WG4, No. V12.1.0 (2013).

Lo Iacono, L., et al., "Web-native Video Live Streaming," The Second International Conference on Building and Exploring Web Based Environments, 14-19 (2014).

Oyman, O., et al., "Quality of Experience for HTTP Adaptive Streaming Services," QoE Management in Emerging Multimedia Services, IEEE Communications Magazine, pp. 20-27 (2012).

* cited by examiner

```
<MPD type = "static" mediaPresentationDuration = "PT3256S"              502
  profiles = "urn:mpeg:dash:profiles:isoff-on-demand:2011"
  global reward signal = "true"
  heuristic parameter1 = xxx
  heuristic parameter2 = xxx
  ...
  Channel target = ws://www.mediaserver.com/video
  Channel parameters = {parameters})>
  <BaseURL>http://www.mediaserver.com</BaseURL>
  <Period>
    <AdaptationSet>
      <BaseURL>movie/</BaseURL>
      <SegmentTemplate media="chunk_$Number$_XMbps.mp4" />
      <Representation />
      ...
    </AdaptationSet>
    ...
  </Period>
  ...
</MPD>
                                                                       mpd.xml
```

504 → `<MPD type = "static"...`
506 → `global reward signal = "true"` / heuristic parameters
508 → `Channel target...`
510 → `<BaseURL>...`

FIG. 5A

```
HTTP/1.0 200 OK                                                        512
Content-type: text/xml
<HTTP header field: global quality value>         514
<other HTTP header fields>

<MPD data>
```

FIG. 5B

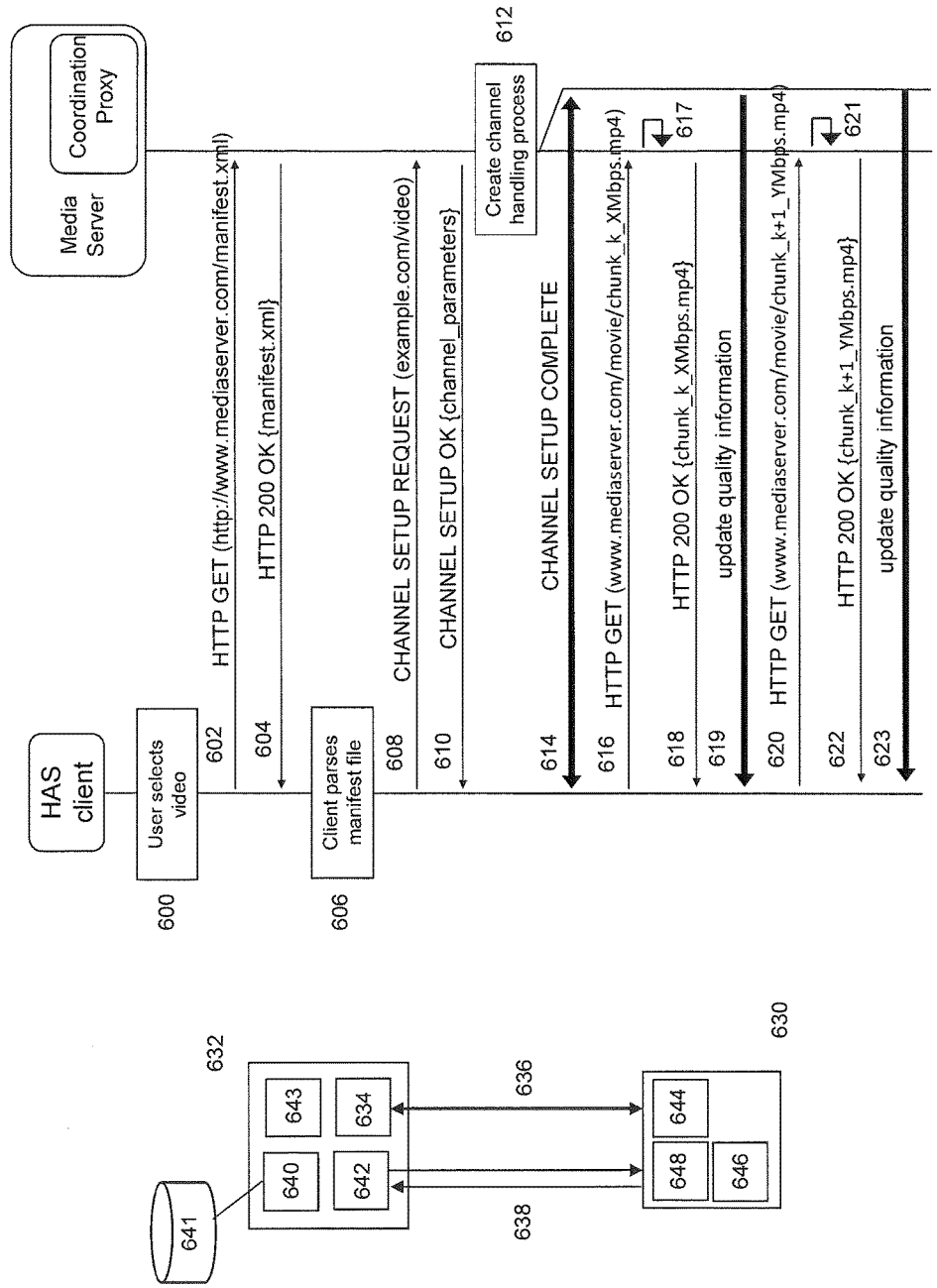

FAIR ADAPTIVE STREAMING

FIELD OF THE INVENTION

The invention relates to adaptive streaming, and, in particular, though not exclusively, to methods for enabling a plurality of adaptive streaming client devices to share network resources, a network node for enabling a plurality of adaptive streaming client devices to share network resources, an adaptive streaming client device configured for sharing network resources with a plurality of other adaptive streaming client devices, non-transitory computer-readable storage medium for storing a data structure for use by said adaptive streaming client device and a computer program product using such methods.

BACKGROUND OF THE INVENTION

HTTP Adaptive Streaming (HAS) is a state of the art video streaming technique that transfers (usually temporally) chunked video over HTTP. A chunk might be referred to as a fragment (which may be stored as part of a larger file) or a segment (which may be stored as separate files). Chunks can have any duration, but are usually either 2 or 10 seconds each. Every chunk is available in one or more quality representations. This allows the client to seamlessly adapt the quality of the video from one chunk request to the next, based on current network and device conditions. The location (usually in the form of a URL) from which every chunk can be retrieved is stored in a manifest file. In Dynamic Adaptive Streaming over HTTP (DASH), the MPEG HAS standard, this file is also referred to as the Media Presentation Description (MPD).

At the start of the streaming session, the client first requests the manifest file, in order to determine the set of quality representations, the representation bitrates, and their locations. Subsequently, the client may start requesting the chunks in sequence using the HTTP protocol. The quality representation in which each chunk is requested is determined by the client's rate adaptation algorithm. In an article by Akhshabi et al. "*What happens when HTTP adaptive streaming players compete for bandwidth?*" Proceedings of the 22nd international workshop on Network and Operating System Support for Digital Audio and Video (NOSSDAV '12), 2012 it is described that state of the art HTTP adaptive streaming video players show different problems when multiple client devices are simultaneously streaming video over a single bottleneck link. These problems may include stability (i.e., ability to retain a specific quality level), fairness (i.e., ability to (fairly) allocate available network resources across the different streaming sessions), and bandwidth utilization (i.e., ability to utilize all available bandwidth resources).

The lack of stability, fairness, and bandwidth utilization were not caused by TCP dynamics, but rather by the typical ON-OFF behaviour of rate adaptation algorithms. ON-OFF behaviour refers to the fact that HAS client devices, when operating in a steady-state with a full buffer, go into alternating states of downloading a chunk (ON) and waiting until there is room in the buffer to download the next chunk (OFF). The ON and OFF periods of different client devices may overlap in different ways (e.g., alternating, coinciding, enveloping), which in turn affects the client-side estimated bandwidth. And it is exactly this wrongly estimated bandwidth value that negatively influences stability, fairness and utilization.

An example of a solution for problems related to competing HAS client devices is described by J. Jiang, et al. in their article, "*Improving fairness, efficiency, and stability in HTTP-based adaptive video streaming with FESTIVE.*" Proceedings of the 8th international conference on Emerging networking experiments and technologies (CoNEXT '12), 2012. The FESTIVE algorithm aims to improve stability, fairness and efficiency. To this end, several optimizations are proposed, such as randomized chunk scheduling, stateful bitrate selection, delayed update, and using the harmonic mean estimated bandwidth. The first optimization improves fairness by reducing synchronized bias of ON and OFF periods (i.e., the ON period overlap becomes random for each subsequent chunk). Moreover, the second optimization is applied to improve fairness by letting the algorithm wait k chunk request periods (with k the current quality level) before allowing the quality to be increased. This policy gives a higher probability of convergence to a fair state, despite the biased bitrate-to-bandwidth relationship (i.e., TCP will give a higher bandwidth share to a client already downloading a higher quality than to a client currently downloading a lower quality).

Pure client-based solutions as described above run the risk of getting stuck in local optima or converging more slowly, both resulting in reduced global and per-client video quality. For example, the client-side FESTIVE algorithm reduces the rate at which client devices improve their bitrates. This leads to slower convergence to the optimal quality, both at the start of a streaming session, as well as after a temporary drop in available bandwidth. Moreover, client-side solutions such as the FESTIVE algorithm may achieve fairness in a scenario where client devices have not yet reached a steady state. However, if a client has already received a steady state, slowly increasing their quality will not allow new client devices to obtain their fair share of the available bandwidth.

Hence from the above it follows that there is a need in the art for improved methods and systems for enabling adaptive streaming client devices to (fairly) share network resources.

SUMMARY OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, chunk, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is an objective of the invention to reduce or eliminate at least one of the drawbacks known in the prior art. The invention aims to enable adaptive streaming client devices that share network resources to render content at the highest possible video quality possible while keeping the deviations between the quality performance (in terms of requested quality levels of chunks or a Quality of Experience) among the client devices as low as possible. Here, the term shared network resources refers to resources in the network, such as network nodes and data links between network nodes, that have a limited capacity and that are shared by the client devices during streaming.

This aim is achieved by a network node, e.g. a proxy, that is configured for monitoring messages, such as chunk request messages (e.g. an HTTP GET requests for a chunk) that are exchanged between a media server and adaptive streaming client devices. The network node may use the monitored information in order to determine an estimate of the quality performance of client devices and to transmit information to client devices that enable the client devices to select a video quality of one or more subsequent chunks.

In an aspect, the invention may relate to a method for enabling a plurality of adaptive streaming client devices to share network resources wherein the method may comprise: a network node monitoring chunk request messages of client devices, said client devices being configured to select a quality level of a chunk from a plurality of selectable quality levels and to request a media server for transmission of a chunk of said selected quality level, said chunk comprising media data associated with content for transmission to said client device.

A chunk may comprise media data associated with content that is transmitted to said client device. The quality level of the media data of the chunk (e.g. video and/or audio data) may be determined on the basis of the bitrate, data format (e.g. Ultra High Definition or High Definition) and/or codec).

The method may further comprise: determining for each of said client devices estimated local quality information using the quality level of one or more monitored chunk request messages of a client device, said local quality information being indicative of a quality level or a Quality of Experience (QoE) of rendering a plurality of chunks by said client device; determining global quality information on the basis of said estimated local quality information of said client devices, said global quality information being indicative of an average quality level or an average QoE of rendering said content by said client devices; and, transmitting said global quality information to at least one client device, said global quality information configured for being used by said at least one client device for selecting a quality level of one or more chunks to be requested by said client device.

By monitoring request messages the node is able to keep track of local quality information, i.e. information that provides an indication, an estimate, of the quality performance of a particular client device. The quality performance of a client device may be estimated by the network node on the basis of the (average) quality of level of chunks requested by a client device or the QoE of each of the plurality of client devices. Here, a known (standardized) expression may be used for determining the QoE of content rendered by a client device. For example, a so-called Mean Opinion Score (MOS) algorithm may be used in order to determine an indication of the perceived video and/or audio quality. Such score may be expressed on the basis of a number within a certain range (e.g. 1 to 5 where 1 is lowest perceived quality, and 5 is the highest perceived quality).

Based on the estimated local quality information of each client device, the network node may determine global quality information that is indicative of an (average) global quality performance of the plurality of client devices. This global quality information may be periodically or repeatedly updated by the network node and sent to the adaptive streaming client devices, which subsequently use the global quality information for selecting a quality level for one or more subsequent chunk request messages in an attempt to minimize differences between the global quality performance (in terms of quality level or QoE) of all client devices collectively and the local quality performance (in terms of quality level or QoE) of an individual client device. Here, each client may be configured to monitor its own local quality information and determine its own quality performance (in terms of average quality level or QoE) on the basis of the quality levels of rendered chunks and on the basis of information on the buffer level of the video player. This way the average quality level of requested chunks or the QoE of individual client devices may converge towards the global average quality level or global average QoE that is representative to the whole set of client devices.

The computation of the estimated local quality information and global quality information is simple so that overload of the network node is avoided and scalability is maintained. Further, no communication is needed among client devices and consequently no significant signalling overhead between client devices is introduced. Moreover, the client devices may independently select the quality level of chucks that are requested by client devices so the HAS principle is not affected. The network node only needs to collect and aggregate the local quality information of the client devices and is not involved in any decision process. Furthermore, the global quality information may be transmitted to the client devices using existing communication channels between the media server and the client devices.

In an embodiment, said selecting a quality level may comprise minimizing the difference between said average quality level provided by said global quality information and the average quality level of chunks processed by said client device. In another embodiment, said selecting a quality level may comprises minimizing the difference between said average QoE provided by said global quality information and the average QoE level of content rendered by said client device. This way, the method may converge to a situation wherein the client devices request chunks of the same or similar (average) quality level or wherein the client devices render content with the same or similar (average) QoE. This way the available bandwidth that is available for streaming content is equally shared between the client devices.

In an embodiment, said global quality information may be periodically or repeatedly determined and transmitted to said client devices.

In an embodiment, said estimated local quality information of a client device may comprise an average quality level of chunks requested by said client within a predetermined time period. In another embodiment, said estimated local quality information of a client device may comprise a Quality of Experience determined on the basis of an average quality level of chunks requested by said client device within a predetermined time period and the spread of quality levels, preferably a standard deviation, of said chunks requested by said client device within said predetermined time period.

In an embodiment, a client device may be configured to use a manifest file for requesting said chunks, said manifest file defining a plurality of selectable quality levels of said content, each quality level being associated with a sequence of chunks.

In an embodiment, transmitting said global quality information to said at least one client device may comprise inserting said global quality information in a chunk response message, preferably in the header of a chunk response message, that is transmitted to said client device. Hence, the global quality information may be sent on the basis of chunk response messages to the client devices.

In an embodiment, sending said global quality information to said plurality of client devices may comprise sending said global quality information over a preferably bi-directional control channel, which is in a preferred embodiment a Websocket control channel (i.e. a control channel based on the Websocket protocol), to a client. A control channel such as a Websocket control channel allows the network node to push the global quality information to the client devices.

In an aspect, the invention may relate to a method for enabling adaptive streaming client devices to share network resources during transmission of content to a plurality of client devices, comprising: at least one of said plurality of client devices transmitting one or more chunk request messages for requesting transmission of at least one chunk of a quality level to a client device, said quality level being selected by said client device from a plurality of selectable quality levels, said chunk comprising media data representing content for transmission to said client device; receiving global quality information from a network node configured for monitoring said one or more chunk request messages, said global quality information being indicative of an average quality level or an average QoE of rendering of a plurality of chunks; determining local quality information indicative of an average quality level or an average QoE of content rendered by said at least one client device; and, selecting a quality level of one or more chunks on the basis of said global quality information and said local quality information.

In an embodiment, selecting a quality level may comprise minimizing the difference between said average quality level provided by said global quality information and said average quality level of chunks processed by said client device. In another embodiment, said selecting a quality level may comprise minimizing the difference between said average QoE provided by said global quality information and said average QoE associated with content rendered by said client device.

In an embodiment receiving said global quality information may comprise receiving a chunk request message; extracting said global quality information from said chunk response message, preferably from one or more data fields in the header of a chunk response message, that is transmitted to said client device.

In an embodiment receiving said global quality information may comprise receiving said global quality information over a (bi-directional) control channel, preferably a Websocket control channel, to a client device.

In a further aspect, the invention may relate to a method for enabling adaptive streaming client devices to share network resources during transmission of content to said client devices, comprising: a network node monitoring chunk request messages of client devices, said client devices being configured to select a quality level of a chunk from a plurality of selectable quality levels and to request a media server for transmission of a chunk of said selected quality level over a data transmission path to said client devices, wherein at least part of said data transmission path is shared by at least part of said client devices; identifying quality levels $q_i(k)$ of a chunk k (k=1, ..., M) requested by said client devices i (i=1, ..., N) in said monitored chunk request messages;

determining estimated local quality information $r_i^f(k)$ associated with each of said client devices on the basis of a said quality levels $q_i(k)$ and one or more quality levels $q_i(k-1), q_i(k-2), \ldots$ of one or more earlier requested chunks, and, optionally, a maximum available quality level $q_m$ of chunk k; determining global quality information gs(k) for said plurality of client devices on the basis said estimated local quality information $r_i^f(k)$; and, transmitting said global quality information gs(k) to at least one client device, said client device being configured to select a quality level for a subsequent chunk k+1 such that the difference between said global quality information gs(k) and local quality information $r_i(k)$ determined by said client device is minimized.

In an embodiment, said estimated local quality information $r_i^f$ may be determined on the basis of a first reward algorithm comprising a first term stimulating selection of the highest or a high quality level and a second term stimulating selection of a quality level such that switches between quality levels are reduced.

In an embodiment, said first reward algorithm may be defined by the expression:

$$r_i^f(k) = -|q_{max} - q_i(k)| - |q_i(k) - q_i(k-1)|$$

wherein $q_{max}$ represents a maximum available quality level of a chunk.

In a further aspect, the invention may relate to a network node for enabling a plurality of adaptive streaming client devices to share network resources during transmission of content to said client devices, said network node comprising a computer readable storage medium having computer readable program code associated with a media client embodied therewith, and a processor, preferably a microprocessor, coupled to the computer readable storage medium, wherein responsive to executing the computer readable program code, the processor is configured to perform executable operations comprising: determining for each of said client devices estimated local quality information using the quality level of one or more monitored chunk request messages of a client device, said local quality information being indicative of a quality level or a Quality of Experience (QoE) of rendering a plurality of chunks by said client device; determining global quality information on the basis of said estimated local quality information of said client devices, said global quality information being indicative of an average quality level or an average QoE of rendering said content by said client devices; and, transmitting said global quality information to at least one client device, said global quality information configured for being used by said at least one client device for selecting a quality level of one or more chunks to be requested by said client device.

In an aspect, the invention may relate to an adaptive streaming client device configured to share network resources with a plurality of client devices during transmission of content to said client device and said plurality of client devices, wherein said client device may comprise: a computer readable storage medium having computer readable program code associated with a media client embodied therewith, and a processor, preferably a microprocessor, coupled to the computer readable storage medium, wherein responsive to executing the computer readable program code, and wherein the processor may be configured to perform executable operations comprising: sending one or more chunk requests messages for requesting transmission of at least one chunk of a quality level to said client device, said quality level being selected from a plurality of selectable quality levels, said chunk comprising media data representing content for transmission to said client device; receiving global quality information from a network node, said global quality information being indicative of an average quality level or an average QoE of content rendered by said plurality of client devices; determining local quality information indicative of an average quality level or an average QoE of content rendered by said at least one client device; and, selecting a quality level of one or more chunks on the basis of said global quality information and said local quality information.

In an embodiment, selecting a quality level may comprise minimizing the difference between said average quality level provided by said global quality information and said average quality level of chunks processed by said client device. In another embodiment, selecting a quality level may comprise minimizing the difference between said average QoE provided by said global quality information and said average QoE associated with content rendered by said client device.

In an embodiment said local quality information may be determined by said client device on the basis of a second reward function, said second reward function comprising a first term for configuring the client device to select the highest or a high quality level.

In an embodiment, said second reward function may comprise a term for configuring the client device to select a quality level such that switches between quality levels are reduced.

In an embodiment, said second reward function may comprise a term for configuring the client device to keep a buffer of a video player at a filling level such that artefacts, preferably video freezes, are reduced during rendering of media data of requested chunks.

In an embodiment, said second reward function may be defined by the expression:

$$r_i(k) = -|q_{max} - q_i(k)| - |q_i(k) - q_i(k-1)| + -|b_{max} - b_i(k)|$$

wherein $q_{max}$ represents a maximum available quality level of the requested chunk, $q_i(k)$ represents the quality level of the requested chunk $q_i(k-1)$ represents the quality level of at least on earlier requested chunk, $b_i(k)$ represents the video player buffer filling level when chunk k is received and $b_{max}$ the buffer saturation level.

In an embodiment, said selecting a quality level may be based on a quality level selection function comprising: a first function that is identical or similar to the reward function $r_i(k)$ as described above; and, a second function that reaches an extremum when local quality information matches said global quality information.

In an embodiment, said quality level selection function may be given by the expression:

$$r_i^{he}(k) = r_i(k) - \alpha \max(r_i^f(k) - gs(k), 0) + -\beta \max(gs(k) - r_i^f(k), 0)$$

In a further aspect, the invention may relate to a non-transitory computer-readable storage medium for storing a data structure, preferably a manifest file, for an adaptive streaming device, said data structure comprising: one or more chunk identifiers and location information, preferably (part of) one or more URLs, for enabling said client device to request a media server the transmission of one or more chunks; one or more selectable quality levels associated with the chunk identifiers for enabling said client device to select a quality level of a chunk; a quality indicator for signaling said client device that global quality information is sent to the client device, said client device using said global quality information for selecting a quality level from said one or more selectable quality levels.

In an embodiment, said quality indicator signaling said client device that at least part of said global quality information is sent in one or more chunk response messages, preferably the header of the chunk response message, to said client device In an embodiment, said data structure may comprise one or more client configuration parameters for initializing the quality selection algorithm of an adaptive streaming client, preferably a client configuration parameter comprising default global quality information or default local quality information for use by said client device.

In an embodiment, said data structure may further comprise: channel set-up information for setting up a communication channel, in particular a (bi-directional) HAS control channel, between a client device and a network node comprising a coordination proxy that is configured to provide global quality information to the client device.

The invention may also relate to a computer program product comprising software code portions configured for, when run in the memory of a computer, executing the method steps according to as described above.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIGS. 5A and 5B depict signalling means for enabling adaptive streaming client devices to share network resources according to various embodiment of the invention.

FIGS. 6A and 6B depict a signaling scheme for enabling adaptive streaming client devices to share network resources according to various embodiment of the invention.

DETAILED DESCRIPTION

Figure 1:
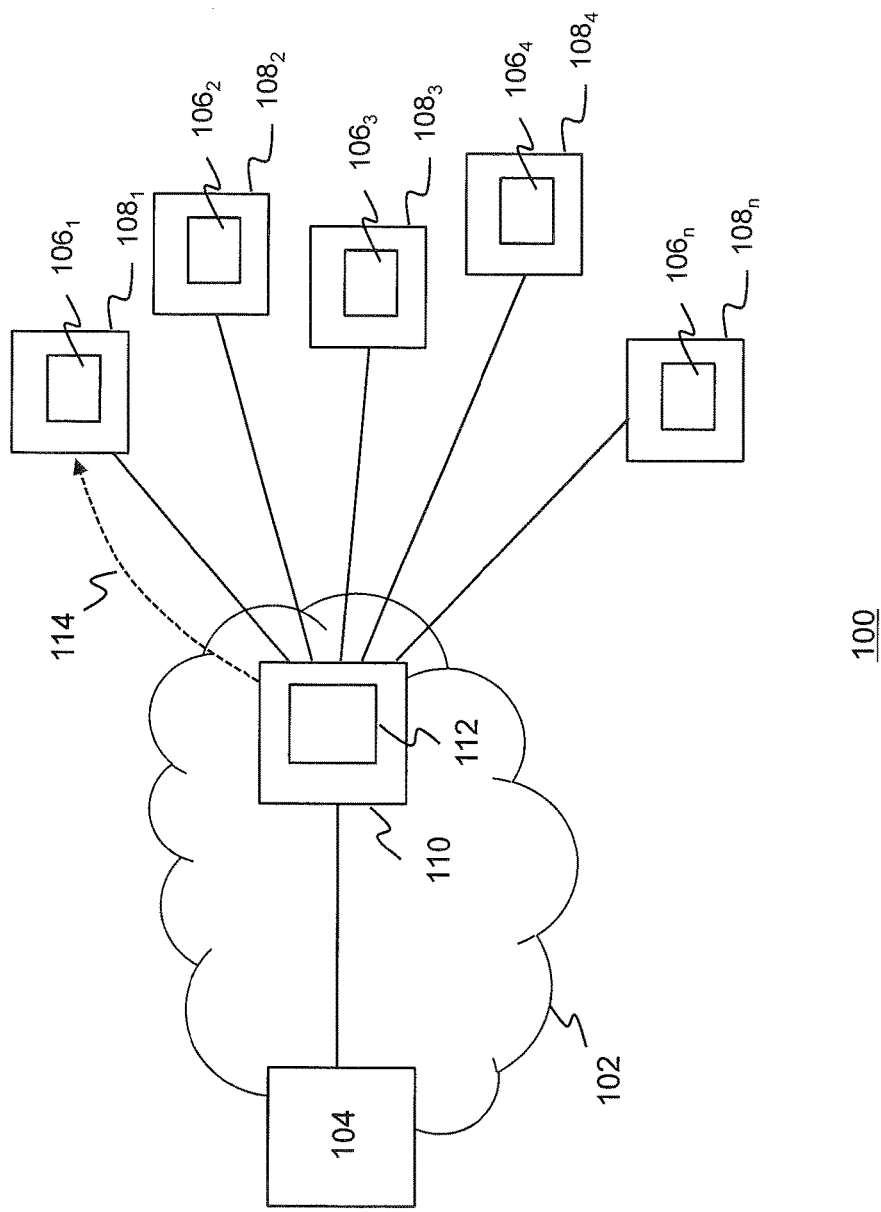
FIG. 1 depicts a content delivery system for enabling adaptive streaming client devices to share network resources according to an embodiment of the invention.

FIG. 1 depicts a content delivery system for enabling adaptive streaming client devices to share network resources according to an embodiment of the invention. In particular, FIG. 1 depicts a content delivery system 100 comprising a network 102 comprising at least one media server 104 and one or more network nodes 110, (e.g. routers, bridges, gateways, switches, proxies, NATs, DSLAMs, caches, etc.) and a plurality of media devices 106. A media device may comprise a client device that is configured to request the media server transmission of content, e.g. video and/or audio content, to the client device and the media server may respond to such requests by transmitting the requested content in a packetized media stream to the client devices. The content may be transmitted as media data by the media server in a suitable data format, e.g. media packets, via the network to a client, which may be identified by a certain unique identifier, e.g. a network address such as an IP address. In an embodiment, the network nodes in the network may be configured as routers, e.g. (HTTP) proxies, for forwarding the media data to the client devices.

The content may be delivered to the client devices using an adaptive streaming protocol such as an HTTP adaptive streaming (HAS) protocol. Examples of HTTP adaptive streaming protocols include Apple HTTP Live Streaming, Microsoft Smooth Streaming, Adobe HTTP Dynamic Streaming, 3GPP-DASH [TS 26.247 Transparent end-to-end Packet-switched Streaming Service (PSS); Progressive Download and Dynamic Adaptive Streaming over HTTP] and MPEG Dynamic Adaptive Streaming over HTTP [MPEG DASH ISO/IEC 23001-6]. These streaming techniques transfer (usually temporally) chunked video over HTTP. A chunk might be referred to as a fragment (stored as part of a larger file) or a segment (stored as separate files). Chunks may have any playout duration, however typically the duration is between 2 second and 10 seconds. A HAS client may render a video title by sequentially requesting chunks from the network, e.g. a content delivery network (CDN), process the requested chunks such that seamless rendering of the video title is assured.

A chunk may be available in one or more quality representations (quality levels) thereby allowing a client to seamlessly adapt the quality of the video from one chunk request to the next, based on current network and device conditions. The one or more locations (usually in the form of one or more URLs) from which chunks may be retrieved are stored in a manifest file. In Dynamic Adaptive Streaming over HTTP (DASH), an MPEG HAS standard, a manifest file may also referred to as the Media Presentation Description (MPD).

When starting a streaming session, a client may first requests a manifest file comprising the information for requesting video chunks from a media server. The manifest file may comprise quality representations (quality levels) of the chunks that may be requested by the client, the representation bitrates, and chunk identifiers, e.g. (parts of) URLs that can be resolved into a network address of a media server on which the media chunks are stored. A client may select a certain quality level (e.g. a certain bitrate) and start requesting the chunk from the network on the basis of an URL in the manifest file. The quality level of the requested chunks is determined by a rate adaptation algorithm of the client.

When multiple client devices are simultaneously streaming video over a shared data link that has a limited bandwidth, the client devices may start competing between each other in order to try to get sufficient bandwidth resources. These competing client devices may lead to problems including stability (i.e., ability to retain a specific quality level), fairness (i.e., ability to fairly distribute available network resources across the different streaming sessions) and bandwidth utilization (i.e., ability to utilize all available bandwidth resources). As will be described hereunder in more detail, the aim of the invention is to provide smooth video playback for a HAS client in a multi-client scheme, i.e. a scheme wherein multiple client devices are simultaneously streaming video over a shared data link that has a limited bandwidth. The invention provides coordination of the adaptive streaming behaviour of streaming client devices in order to achieve a fair distribution of recourses amongst the client devices. This effect is achieved using a network node 112, e.g. a proxy, that is capable of collecting information that is exchanged between a plurality of client devices and the media server during the streaming process.

The network node (which hereafter may be referred to as a coordination proxy) may be configured to: determine estimated local quality information on the quality performance (in terms of requested quality levels and/or quality of experience) of each individual client device, to use said estimated local quality information in order to determine global quality information which provides an indication of the quality performance by the client devices as a whole (in terms of an average requested quality level and/or an average quality of experience); and to send the global quality information 114 to the client devices. The global quality information may be used by the client devices to learn about the best selection of a quality level for a subsequent chunk for given network conditions so that similar quality performance amongst the client devices can be achieved.

Hereunder, the multi-client fairness problem that occurs when multiple adaptive streaming client devices simultaneously request content from a media server is addressed in greater detail. In general, the aim is to reach the highest possible video quality at the client devices while keeping the deviations in video quality (in terms of quality levels and/or quality experienced by a client) among the client devices as low as possible. The formal problem characterization may be given by the following optimization problem:

$$J(q) = \xi \times QualityIndex(q) + (1-\xi) \times FairIndex(q)$$

with $\xi \in [0, 1]$ $$\underset{q=(q_1,\ldots,q_N)}{\text{maximize }} J(q)$$

subject to $1 \le q_i(k) \le q_{max} \forall\, i = 1 \ldots N, \forall\, k = 1 \ldots K$ $DT_i^k(q, \text{Bandwidth}) \le BL_i^k$ $\forall\, i = 1 \ldots N, \forall\, k = 1 \ldots K$ wherein N represents the number of client devices, K represents number of chunks the video content is composed of, $q_i(k)$ represents the quality level requested by the i-th client for the k-th chunk, $q_i$ represents the vector containing all the quality levels requested by client i and $q_{max}$ represents the highest available quality level of the video content. $DT_i^k$ represents the download time of the k-th chunk, while $BL_i^k$ denotes the video player buffer filling level of client i when the k-th chunk download starts. Bandwidth is the vector containing the bandwidth pattern.

The objective function J(q) is the linear combination of two terms. The first one, QualityIndex(q), measures the overall video streaming quality at the client devices side. The second term, FairnessIndex(q), represents the fairness of the system. The final formulation of QualityIndex(q) and FairIndex(q) depends on the actual interpretation given to the video quality at the client. From an application-aware point of view, video quality is explicitly associated with the user perceived video quality, or QoE. This way, fairness can be achieved from a QoE point of view: client devices have to reach similar perceived video quality. In this case, QualityIndex(q) can be characterized as the average of QoE of content rendered by the client devices, while the spread of the QoE amongst the client devices can be expressed as a standard deviation from this average QoE. A model that can be used to compute the QoE for a client is described hereunder in more detail.

On the other hand, if the main issue is on network resource optimization, video quality can be associated to the bit rate achieved by the client or, equivalently, to the (average) quality level requested. With this application-agnostic formulation, fairness from a network point of view may be achieved: in that case it is the goal to request the same average quality level, i.e. to equally share the available bandwidth. In light of the above, QualityIndex(q) and FairIndex(q) can be computed as the average and standard deviation of client devices' average requested quality level, respectively.

Both the application-aware and application-agnostic interpretations of fairness are valid and may be used depending on the focus given to the multi-client optimization problem. In this application, the focus was on the application-aware interpretation of the client, since it is directly correlated to the user perceived quality of the video streaming. Nevertheless, the proposed invention may be easily modified to deal with the application-agnostic interpretation of the multi-client optimization problem.

In light of the above, it is clear why QualityIndex(q) and FairIndex(q) have to be optimized together. If only the maximization of the fairness index is considered, client devices may obtain similar but unacceptable video qualities from a QoE point of view. Instead, it is also an aim of the invention in order to reach the highest possible video quality at the client devices. Depending on applications and scenarios, the parameter may be tuned to benefit one of the two terms.

The second constraint of the optimization problem is the avoidance of freezes and other sort of artifacts in the video playback. The download time of the next chunk ($DT_i^k$) has to be lower than the video player buffer filling level when the download starts ($BL_i^k$). In this way, it is avoided that the video player buffer becomes empty (or at least below a certain panic threshold) so that freezes are avoided. The download time may not only be a function of the quality level requested by client i, but also of the quality levels downloaded simultaneously by other client devices and/or of the available bandwidth.

Single-client algorithms that are configured to improve the QoE under dynamic network conditions cannot handle the above-described multi-client fairness problem. An example of such single-client algorithm is the so-called reinforcement learning (RL) client that allow dynamically selection of the best quality level on the basis of its past experience (such as the single-client Q-Learning algorithms described by Cleays et. al. in the article "*Design of a Q-learning based client quality selection algorithm for HTTP adaptive streaming*", Proceedings of the Adaptive and Learning Agents Workshop, part of AAMAS2013, May 2013).

The single-client RL algorithm is based on the determination of a local quality reward $r_i(k)$ experienced by client i when the k-th chunk is downloaded. The local quality reward $r_i(k)$ may be determined by the following expression:

$$r_i(k) = -|q_{max} - q_i(k)| - |q_i(k) - q_i(k-1)| + -|b_{max} - b_i(k)|$$

wherein $q_i(k-1)$ represents the quality level requested at the (k-1)-th step, $b_i(k)$ represents the video player buffer filling level when the download is completed and $b_{max}$ the buffer saturation level. Moreover, when $b_i(k)$ is equal to zero, i.e. when a video freeze occurs, $r_i(k)$ is set to −100. Hence, the first two terms may drive the client to request the highest possible quality level, while keeping quality switches limited. These two factors have a big impact on the perceived quality. The last term is used to avoid freezes in the video playout, which also have a big impact on the final QoE.

In order to evaluate the QoE experienced by a client i, the so-called Mean Opinion Score (MOS) may be determined. The MOS (QoE) of client i requesting chunks can be determined on the basis of the following expression:

$$QoE_i(t, t+T) = MOS_i(t, t+T) = 0.81 \times \bar{q}_i(t, t+T) + -0.96 \times \hat{q}_i(t, t+T) + 0.17 - 4.94 \times F_i(t, t+T)$$

This expression shows that the QoE experienced by client i within a time window [t;t+T] is a linear combination of the average quality level $\bar{q}_i(t;t+T)$ requested by the client, the standard deviation $\hat{q}_i(t;t+T)$ and a term $F_i(t;t+T)$, which models the influence of freezes and is computed as in the following:

$$F_i(t, t+T) = \frac{7}{8} \times \left( \frac{\ln(f_i^{freq}(t, t+T))}{6} + 1 \right) + + \frac{1}{8} \times \left( \frac{\min(f_i^{avg}(t, t+T), 15)}{15} \right)$$

Here, $f_i^{freq}(t;t+T)$ and $f_i^{avg}(t; t+T)$ are the freezes frequency and the average freeze duration, respectively. The above two expressions and their coefficients have been described in detail in the article by Cleays et. al. (as cited above).

The action the RL client may take at each quality decision step is to select one of the quality levels that is available to the client. Consequently, each client may have NL possible actions to perform, wherein NL represents the number of available quality levels (e.g. in terms of bitrate and/or video format such has UHD, HD and CD) of a video chunk. The aim of the RL algorithm is to select the best quality level depending on two parameters, which compose the client state space. The first one is the local perceived bandwidth, while the second is the buffer filling level $b_i(k)$.

This model however does not take into account multiple client devices simultaneously requesting content from the media server wherein client devices share a single medium so that the presence of a client may have a negative impact on the performance of others. Hereunder, multi-client adaptive streaming processes and systems are described that provides smooth video playback while coordinating with other client devices in order to improve the fairness (in terms of a quality level and/or QoE) of the entire system.

Figure 2:
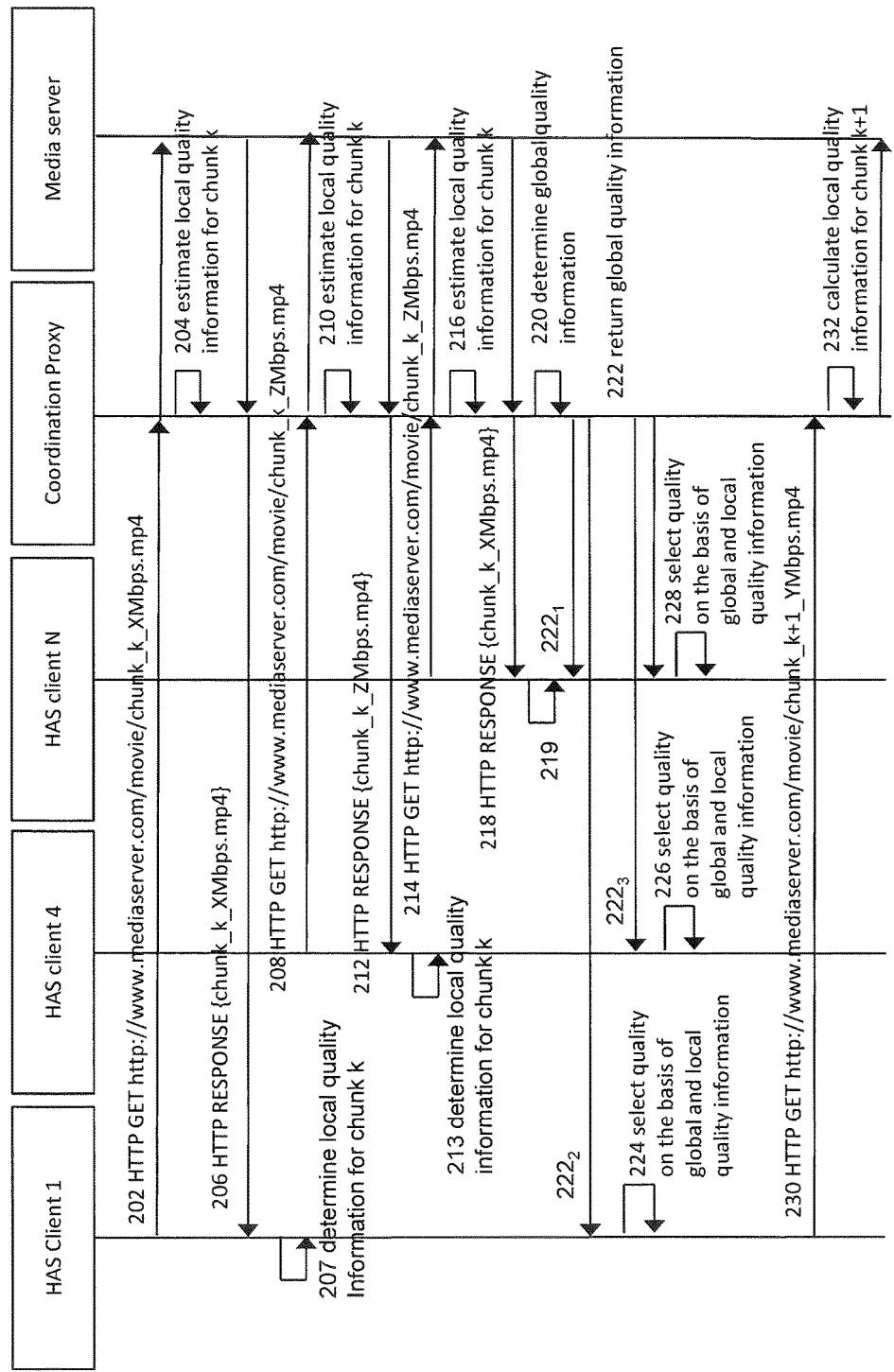
FIG. 2 depicts a process for enabling a plurality of adaptive streaming client devices to share network resources according to an embodiment of the invention.

FIG. 2 depicts a process for enabling a plurality of adaptive streaming client devices to share network resources according to an embodiment of the invention. In particular, FIG. 2 depicts a process wherein a coordination proxy monitors chunk requests originating from adaptive streaming client devices that are requesting chunks of a particular quality level from a media server in order to collect local quality information associated with each client of the plurality of client and that uses the collected local quality information in order to generate global quality information, i.e. an average quality level or QoE of content rendered by the plurality of client devices. The global quality information is sent to the client devices that may use the global quality information for selecting a quality level from a plurality of selectable quality levels of a further chunk. The client devices may be provided with a manifest file so that it can identify and request chunks of a particular quality level from a media server.

As shown in FIG. 2, during the streaming process, a first client 1 may request a chunk k of a particular quality level by sending a chunk request message, e.g. an HTTP request messages, comprising an URL for localizing the chunk on the media server (step 202). The client may send the request messages via the coordination proxy to the media server, wherein the coordination proxy may monitor the quality level of the chunks that are requested by the client devices. The quality level of chunk may be determined on the basis of the bitrate the quality type of the bitrate that is required for rendering media data of a chunk, the data format of media data of a chunk (e.g. Ultra High Definition or High Definition) and/or codec). In an embodiment, a chunk may be identified in the URL of a chunk request message using an URL template that comprises a chunk name, a chunk (sequence) number and the quality level of the requested chunk. For example, the URL http://www.mediaserver.com/movie/chunk_k_XMbps.mp4 in step 202 of FIG. 2 may define a chunk with a name "chunk", chunk number k and quality level X. In that case, the coordination proxy may use the information in the URL in order to determine the quality level of the requested chunk.

When the coordination proxy has identified the quality level of the requested chunk, it may use the identified quality level in order to determine an estimate of local quality information experienced by client i when the k-th chunk is received (step 204).

In an embodiment, the local quality information may comprise (an estimate of) a local quality reward $r_i^f$ i=1, . . . , N of a single-client RL algorithm as e.g. described in the article by Claeys et al. (cited above). The local quality reward may be estimated on the basis of the monitored quality level without taking into account the buffer filling level $b_i(k)$ (which can only be computed by the client once the new chunk is received and therefore is not accessible by the coordination proxy):

$$r_i^f(k)=-|q_{max}-q_i(k)|-|q_i(k)-q_i(k-1)|$$

In another embodiment, the local quality information may comprise (an estimate of) a QoE experienced by a client i. As described above, when using the MOS model the QoE experienced by a client may be determined (estimated) on the basis of average quality level requested by a client and the standard deviation of the average quality level (i.e. quality information a coordination proxy can determine by monitoring the chunk request messages) without taking the number of freezes into account. In response to the chunk request, the media server may send the requested chunk to the client in a response message (step 206). Thereafter, the client may start the playout of the media data of chunk k. During the playout of the media data a local quality calculation module may (continuously) determine local quality information of the client (step 207). For example, it may determine a local quality reward $r_i(k)$ of a single-client RL algorithm (including a buffer term which incorporates freezes) or a local $QoE_i(t;t+T)$ on the basis of a MOS model that includes a term for incorporating freezing effects. The local quality information may be used at a later stage when the client needs to select a quality level of a further chunk.

The process described with references to steps 202-207 may executed for the plurality of client devices i (i=1, ..., N) in an asynchronous way so that the coordination proxy estimates local quality information for each client or at least a large part of the plurality of client devices requesting a chunk k and the client devices determine local quality information during the rendering of chunk k (steps 208-219). Here it is noted that individual client devices may request different quality levels due to differences in the local circumstances of each client. For example, in FIG. 2, client i=1 and client N may request the X Mbps quality level of chunk k (steps 202 and 214) while client i=4 may request the Z Mbps quality level of chunk k (step 208).

The thus estimated local quality information for requested chunk k may then be aggregated into global quality information representing the quality performance of the global system, i.e. the plurality of client devices or at least a large part thereof (step 220). This global quality information may be indicative of the global quality performance of the entire system in terms of average requested quality level and/or average OoE. This global quality information may help client devices achieving stable streaming behavior of similar average quality level (and thus fair allocation of network resources) and/or similar average QoE. In an embodiment, in case of a RL algorithm, the global quality information may be calculated as an average of the local quality rewards $r_i^f(k)$ i=1, ..., N. In an embodiment, an average gs(k) of the local quality rewards $r_i^f(k)$ may be calculated on the basis of the following expression:

$$gs(k) = \frac{1}{N}\sum_{i=1}^{N} r_i^f(k)$$

In another embodiment, the global quality information may be determined as an average QoE calculated on the basis of the (local) QoE experienced by each of the plurality of client devices (or a substantial part thereof). In an embodiment, the so-called Mean Opinion Score (MOS) may be used in order to determine a number that is indicative of the QoE of content rendered by a client device.

Considering that client devices are not synchronized, i.e. requesting chunks at different moments, the global quality information may be continuously or repeatedly updated by the coordination proxy. For example, the coordination proxy may update the global quality information each time when client devices request a new chunk. In an embodiment, the global quality information may be sent, e.g. broadcasted, as global quality information to the client devices (step $222_{1-3}$). In another embodiment (not shown), the global quality information may be inserted in a data field of the HTTP header and returned to the client devices in a response message comprising the next chunk for playout.

The client devices may use the received global quality information (e.g. the average quality level and/or the average QoE) and the local quality information determined by the client during the rendering of media data of chunk k in order to select a quality level from a plurality of quality levels of a further chunk k+1 that is going to be requested by the client. In particular, the global quality information may inform an adaptive streaming client about deviations between its local quality performance represented by the local quality information (in terms of e.g. requested quality levels and/or experienced Quality of Experience) and the global quality performance of the entire system represented by the global quality information (in terms of an average quality level and/or average QoE). The client may request a quality level so that the deviations between the local and global quality information is minimized.

In this way, adaptive streaming client devices may learn how to modify their behaviour to achieve similar quality performance, i.e. fairness in quality performance. Hence, on the basis of the global quality information client devices may select a chunk of a particular quality level using the information in the manifest file (steps 224-228). For example, in FIG. 2, client 1 may determine to select the next chunk k+1 in a Y Mbps quality level and thus send a chunk request message comprising a chunk identifier chunk_k+1_YMbps.mp4 to the media server. The information in the request message may be used by the coordination proxy to calculate an estimate of local quality information of a next chunk (e.g. local quality reward $r_i^f(k+1)$ of a next chunk k+1).

Hence, the process in FIG. 2 provides a solution for achieving similar streaming behaviour in terms of quality levels requested by the client devices or QoE experienced by the client devices. The intermediary coordination proxy may monitor or intercept client HTTP GET requests for chunks and keeps track of the requested quality level of each client. Based on this local quality information, it may determine global quality information for all client devices. The global quality information may be repeatedly updated and sent to the adaptive streaming client devices, which subsequently use this global quality information for selecting the quality level for subsequent chunk requests in an attempt to converge to a situation wherein client devices render content at the highest or a high video quality while keeping the deviations between the quality performance (in terms of requested quality levels of chunks or a Quality of Experience) among the client devices as low as possible.

The computation of the estimated local quality information and the global quality information are simple so that overload of the coordination proxy is avoided and scalability is maintained. The main advantage of this hybrid approach is two-fold. First, no communication is needed among client devices and consequently no significant overhead is introduced. Second, each client independently determines its own quality level so the HAS principle is not altered. The coordination proxy has only to collect and aggregate the estimated local quality information of the client devices and is not involved in any decision-making process. Furthermore, the transmission of the global quality information can be realized using existing communication channels between the media server and the client devices.

Figure 3B:
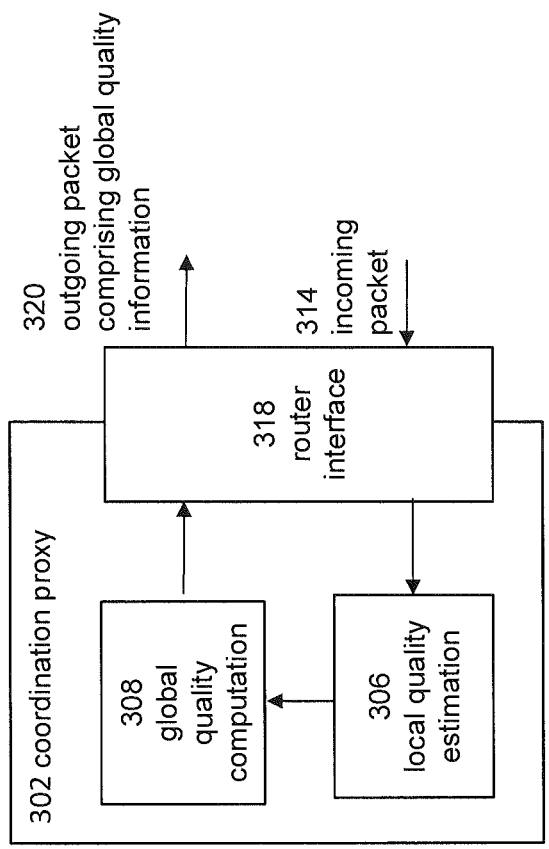
FIGS. 3A and 3B depict schematics of a proxy server for enabling a plurality of adaptive streaming client devices to share network resources according to an embodiment of the invention.
Figure 3A:
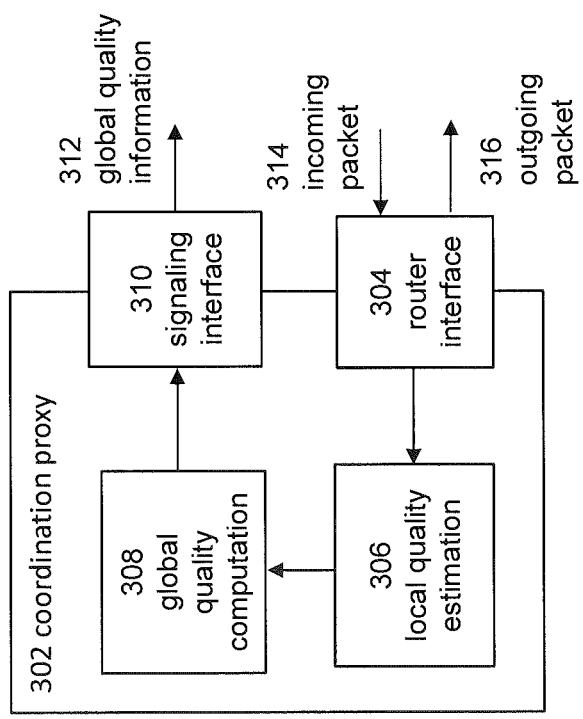

FIGS. 3A and 3B depict schematics of a network node, e.g. a proxy server, comprising a coordination proxy for enabling fair adaptive streaming between client devices according to various embodiments of the invention. In particular, FIG. 3A depicts a schematic of a coordination proxy that is configured to help client devices achieving fairness by determining global quality information on the basis of estimated local quality information of individual client devices, wherein the global quality information may help client devices to select the quality level of future chunks. As described with reference to FIG. 2, the coordination proxy monitors the performance of the system and returns this information as global quality information to the client devices that use this information to learn a fair quality selection policy. To that end, the coordination proxy 302 may comprise a router interface 304 for receiving (incoming) packets 314 originating from streaming client devices, e.g. chunk request messages, and for (transparently) forwarding (outgoing) packets 316 to the media server. During the routing process, the content of the chunk request messages may be monitored on information about the quality level of requested chunk. This information may be forwarded to a local quality estimation module 306 for calculating an estimate of local quality information such as an estimate of the local quality reward $r^i(k)$ or the QoE experienced by a client when requesting a chunk k. The estimated local quality information is collected and forwarded to a global quality computation module 308 for calculating global quality information that is used by client devices in their decision whether it should modify the quality level of chunks it is requesting and—if so—what quality level it should select in order to achieve a substantial similar quality performance compared to all or at least a substantial part of the client devices that request content from a media server. Thereafter, the global quality information may be forwarded to a signaling interface 310 of the coordination proxy that is configured to establish a signaling channel with the client devices so that the global quality information may be sent to the client devices. In an embodiment, the signaling interface may be configured to use the WebSocket protocol for establishing a bi-directional communication channel between the coordination proxy or the network node on which the coordination proxy is executed. The set-up and use of such WebSock communication channel is described hereunder in greater detail with reference to FIG. 6.

FIG. 3B depicts a coordination proxy that is similar to the one described with reference to FIG. 3A, however in this particular embodiment, the global quality information determined by the global reward computation module 308 may be provided to the router interface 318 which inserts the global quality information in a data field of the header of the outgoing packet 320. For example, in an embodiment, the coordination proxy may insert the global quality information in a data field of the HTTP header of the HTTP response message comprising the requested chunk.

Figure 4:
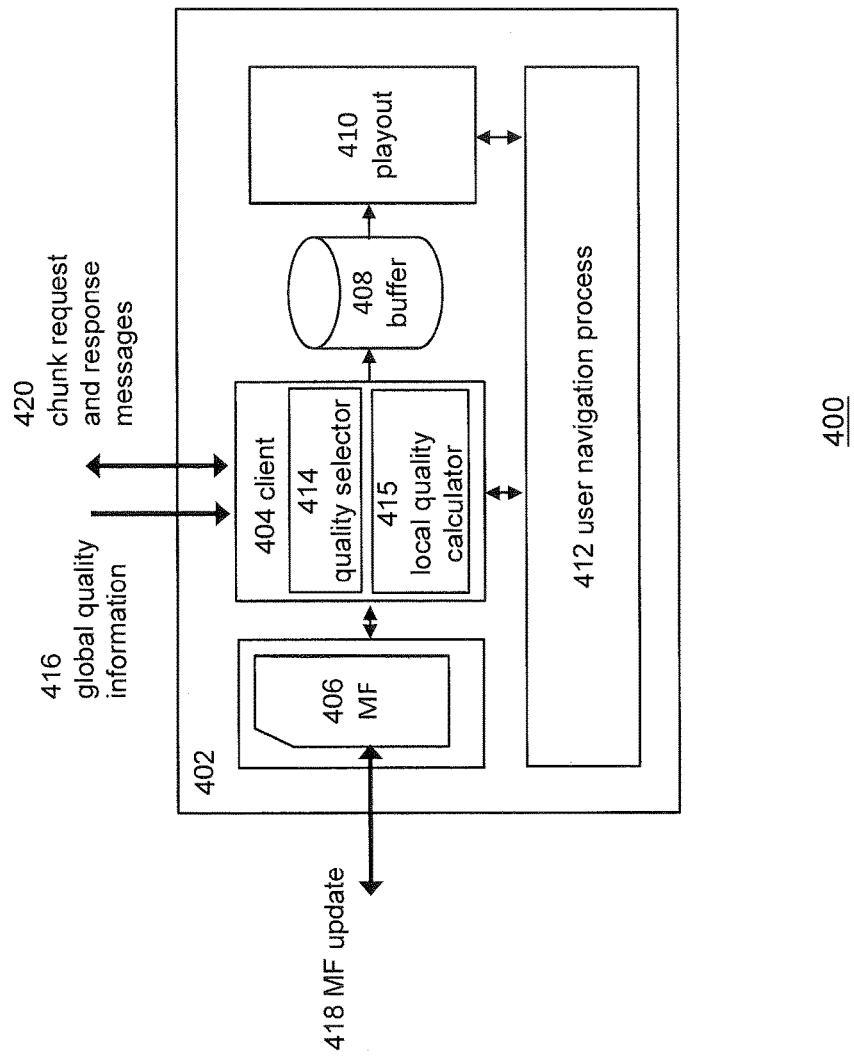
FIG. 4 depicts schematics of a user device comprising an adaptive streaming client device according to an embodiment of the invention.

FIG. 4 depicts schematics of a user device comprising an adaptive streaming client according to an embodiment of the invention. In particular, FIG. 4 depicts a user device according to an embodiment of the invention. The user device 402 may comprise an adaptive streaming (AS) client 404, preferably a HTTP adaptive streaming (HAS) client, which is configured to communicate with one or more media servers, e.g. a HAS server, in the network. Further, the client may be configured to request and receive (one or more streams of) media packets from a media server on the basis of an adaptive streaming protocol. The user device may generally relate to a content processing device, e.g. a (mobile) content play-out device such as an electronic tablet, a smart-phone, a notebook, a television, a media player, etc. In some embodiments, a user device may be a set-top box or content storage device configured for processing and (temporarily) storing or caching content for future consumption by a content playout device.

A user may instruct a user device to connect to a network, e.g. the Internet, browse a website of a content provider comprising video title links and select one for playout. After selection of a video title, a manifest file (MF) may be sent to the client. Here, the term manifest file may generally refer to a special data structure comprising chunk identifiers (descriptors) identifying the chunks building the video title (or at least part thereof), one or more quality representations (quality levels) of the chunks, location information of a (set of) network node(s), e.g. media server(s), which may be configured to either deliver the chunks to the client or to provide the client with information where the chunks may be retrieved. Optionally, the manifest file may comprise chunk control information determining the relation between the chunks, which may be used by the client to correctly sequence chunks for play-out. In some cases, e.g. live stream, multiple manifest files (manifest updates) may be used to playout the media. Different protocols may use different names for a manifest file. For example, in the DASH streaming protocol a manifest file may be referred to as a media presentation description (MPD).

As illustrated in FIG. 4, the manifest file may be stored in a manifest cache 406 and parsed and structured into a chunk list, i.e. a logical data structure, comprising information for retrieving chunks, e.g. chunk identifiers or a template for generating chunk identifiers, e.g. a predetermined parts of URL(s), for determining where these chunks may be retrieved, the quality levels in which the chunks are available to the client, and playout control information for controlling the playout of the chunks, i.e. the relation between the chunks (e.g. time relationship, quality relationship and/or spatial relationship).

The AS client may use the chunk identifiers and the quality representations in the manifest cache in order to retrieve chunks of a certain quality level (e.g. a certain bitrate and/or quality format) from a media server or one or more delivery nodes associated with a content delivery network (CDN). The chunks may be retrieved using a (chunk) transfer protocol (typically this would be HTTP, however other protocols such as RTSP/RTP, FTP and other protocols may also be used) and temporarily stored into a buffer 408. Further, a video playout function 410 (the media engine or a media player) may playout chunks stored in the buffer on the basis of the information in the manifest cache.

A chunk retrieval function of the client may be configured to retrieve chunks such that the buffer is loaded with a predetermined number of chunks before play-out is started. Furthermore, during playout, the client continuously retrieves chunks on the basis of the manifest file so that sufficient chunks are stored in the chunk buffer. The client may accept and handle chunk retrieval instructions from a user navigation function 412 that is connected to a (graphical) user interface (not shown) of the user device. This way, a user is able to navigate through the chunks as defined by the manifest file.

The client may comprise quality selection module 414 and a local quality calculation module 415. These modules may be implemented as software code comprising code portions that are executed by a processor of the user device. The quality selection module may select a quality representation of chunk that is going to be requested by the client on the basis of the global quality information 416 that is sent by the coordination proxy to the client and an the basis of local quality information. The client may select a quality level such that deviations between its local quality performance and the global quality performance of the entire system represented by the global quality information are minimized.

In case of a multi-client RL scheme, the client devices need a reward algorithm that not only achieves high quality video streaming at the client side, but also fairness in terms of quality performance among client devices. Hence, in order to achieve these objectives, a term needs to be added to the single-client RL algorithm $r_i(k)$ that takes the latter objective into account. In an embodiment, a Homo Egualis (HE)-like reward term (S. de Jong et al. "*Artificial agents learning human fairness*", proceedings of $7^{th}$ International Conference on Autonomous Agents and Multiagent systems (AAMAS 2008), pp. 863-870, 2008) may be added to the single-client RL algorithm $r_i(k)$. The general formulation may be given by the following equation:

$$r_i^{he} = r_i - \alpha \sum_{r_i > r_j} \frac{r_i - r_j}{N-1} - \beta \sum_{r_j > r_i} \frac{r_j - r_i}{N-1}$$

Here, the total reward $r_i^{he}$ is composed by a first term, the local reward a client experiences while interacting with its environment. The other two terms take into account the performance of the other client devices. Each client experiences a punishment when other client devices have a higher reward as well as when they have a lower reward. The total reward $r^{he}$ reaches its maximum when $r_j = r_i$, for each j, i.e. when the client devices show a fair behavior.

The HE reward $r_i^{he}$ however is not directly applicable to the HAS case, as it requires a direct reward communication between the client devices. For this reason, the global quality information gs(k) is defined that has been designed to represent the overall performance of the system. In that case, the expression for the HE reward $r^{he}$ can be rewritten as follows:

$$r_i^{he}(k) = r_i(k) - \alpha \max(r_i^f(k) - gs(k), 0) + -\beta \max(gs(k) - r_i^f(k), 0)$$

wherein $r_i(k)$ is the local quality reward for requested chunk k as described above for the single-client RL algorithm. In accordance to the computation of the global quality information, the punishment term $r_i^f(k)$ in $r_i^{he}(k)$ may be computed using only the quality and the switching reward term. In this formulation the coordination proxy acts as a "macro-agent" providing information on the behavior of the entire system to the client devices. The reward reaches a maximum when $r_i^f(k) = gs(k)$, i.e. when the estimated quality behavior of the client matches that of the macro-agent. When the reward is far from the global signal, the punishment term operates to modify the client devices' quality selection policy. This way, the reward of the client $r_i^f(k)$ will converge to a similar value indicating that similar performance in terms of quality is achieved and, consequently, fairness. The value of α and β may be set to 1.5 in order to benefit from the punishment term and give higher priority to the fairness goal in the learning process of the client devices.

Figure 7A:
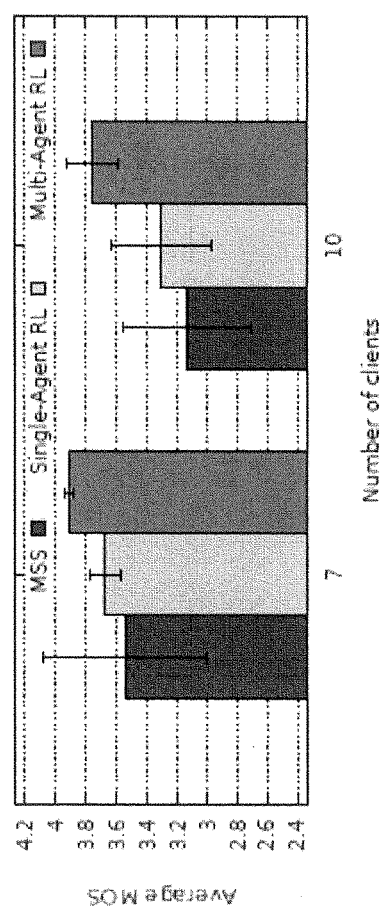
FIGS. 7A and 7B depict a comparison between the performance of a client device according to an embodiment of the invention and several known streaming client devices.
Figure 7B:
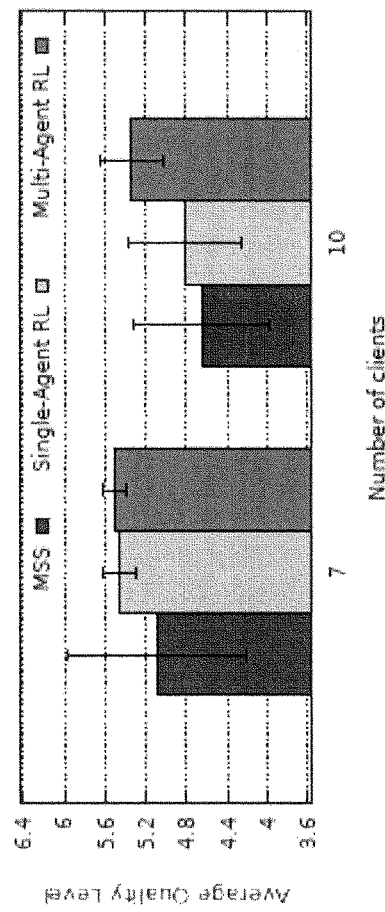

FIGS. 7A and 7B depict a comparison between the performance of a client device according to an embodiment of the invention and several known streaming client devices. In particular, FIG. 7A shows the results obtained when analyzing client devices performance according to the application-aware interpretation of the multi-client optimization problem. Each bar in FIG. 7A represents the average MOS of an entire set of client devices, together with its standard deviation. As shown in FIG. 7A, the known MSS client presents a very high standard deviation, both for a 7 and 10 client devices scenario. This entails there is a big difference among the video quality perceived by different client devices, i.e. unfairness. An improvement can be achieved when using the single-client RL approach in which a client device is charge of dynamically selecting the best quality level on the basis of its past experience. As shown in FIG. 7A, the single-client RL algorithm is able to reduce MOS standard deviation by 80% and 20%, in the 7 and 10 client devices case respectively. This is a substantial improvement over the MSS client, considering that, in this case, there is no coordination mechanism between client devices present. Nevertheless, the lack of coordination affects the average MOS, which is similar to the average MOS of the MSS client.

The multi-client RL scheme proposed by the inventors is able to improve the average MOS by 11% for 7 client devices and by 20% for 10 client devices with respect to MSS. Moreover, a very good fair behavior is obtained for the 7 client devices scenario. For the 10 client devices case, the standard deviation is 48% less than the single-client solution and 60% less than the MSS client indicating a significant improvement in the fairness amongst the client devices.

In FIG. 7B the network analysis for the different client scenarios is depicted. In this case, the performance of the client devices is evaluated considering the application-agnostic interpretation of the optimization problem. The graphs of FIG. 7B show the average requested quality level and standard deviation of average requested quality level of the different client devices. Also in this case, the MSS client deviation is very high showing that these client devices are not able to fairly share network resources amongst each other and/or to achieve a similar QoE level. In contrast, the multi-client RL algorithm according to the invention allows considerable reduction of the deviation of the average quality level requested by the client devices, both with respect to MSS client and the single-client RL scheme. The situation arising in the 7 client devices scenario is of particular interest. In this case, the single-client RL scheme performance is close to that of the multi-agent one. When compared with the results shown in FIG. 7A for the 7 client devices scenario, a bigger difference between the average MOS of the two client devices is visible. This entails that in this case, exploited resources being equal, the multi-agent client results in a better overall perceived video quality, i.e. is more efficient.

Hence, from the above it follows that the multi-client RL algorithm may help client devices coordinating their behaviour without the need of explicit client-to-client communication or a centralized decision process. Consequently, the quality level selection can still be performed locally and independently by each client, without any modification to the general HAS principle. The proxy-based solution deploys intelligent components into the network that influence HAS streams in such a way that stability and interclient fairness increase. Such proxy-based solution may assume the client devices run a custom rate adaptation algorithm based on reinforcement learning, but could trivially be adapted to different types of client algorithms.

FIGS. 5A and 5B depict data structures for enabling adaptive streaming client devices to share network resources according to various embodiment of the invention. In particular, FIGS. 5A and 5B depicts various data containers that can be used for transmitting signaling information associated with the multi-client learning algorithm to the client, e.g. client configuration parameters for configuring the adaptive streaming client. For example, FIG. 5A depicts a manifest file 502 (e.g. an MPD in xml format) that may be sent in an HTTP response message to the client. The manifest file may comprise client configuration parameters 504, 506, 508, 510. One client configuration parameter may comprise a reward indicator 504, e.g. a flag, for signaling the adaptive streaming client that during the streaming process global quality information may be sent to the client, and, optionally, that the global quality information is sent in the chunk response messages, preferably in the header of chunk response messages, to the client devices. The reward indicator may also signal adaptive streaming client devices which type of reward mechanism the coordination proxy uses. The client configuration parameters may further include initialization parameters 506 for initializing the quality selection algorithm (e.g. a multi-client learning algorithm as described above), e.g. default values, e.g. (default) global quality information and/or (default) local quality information which the client may use at the start of the process.

Alternatively and/or in addition, in a further embodiment, said client configuration parameters may comprise channel set-up information 508, 510 for setting up a communication channel, in particular a (bi-directional) HAS control channel between a client and a network node comprising a coordination proxy that is configured to provide global quality information to the client. In one embodiment, the channel set-up information may comprise a channel target parameter 508 providing a reference to the network node comprising the coordination proxy. Further, in another embodiment, the channel set-up information may comprise channel parameters 510, i.e. parameters used by the network node for setting up and managing said control channel. For example, in the case of the WebSocket protocol, the parameters may refer to the use of WebSocket sub-protocols, WebSocket version, etc. The set-up and use of a HAS control channel is described in more detail with reference to FIGS. 6A and 6B.

FIG. 5B depicts part of an HTTP message wherein the header comprises a reward signal value 514 that can be used by the client in order to determine a quality level for selecting chunks.

FIG. 6A depicts a protocol flow between a user device 630 and network node 632 for setting up a bi-directional HAS control channel according to an embodiment of the invention. The user device may comprise a HAS client 648 and a media engine 646 (similar or identical to the one described with reference to FIG. 4). The network node may comprise coordination proxy for determining global quality information that may be used by the streaming client for selecting a particular quality representation of a chunk.

The content processing device and the server system may further comprise a control channel client function (CCCF) 644 and a control channel server function (CCSF), e.g. a HAS control channel server function 634 respectively, which are configured to establish a HAS control channel 636 between the CCSF and the CCCF 644. Here, the HAS control channel may be used to exchange HAS control information between the client and the server. In particular, the HAS control channel may be used to send global quality information originating from the network to the client during the streaming of chunked media 638 to the client.

Here, the process may start in similar ways as described above with reference to the other processes, e.g. a user joining a live streaming event (step 600). The client may send an HTTP GET request to obtain a manifest file from the server system, which may respond to the request by sending a manifest file to the client (step 602, 604).

The CCSF in the server is configured to insert channel set-up information in the manifest file, which allows the CCCF in the client and the CCSF in the server to set up a streaming control channel. Hence, during parsing of the manifest file (step 606), the channel set-up information may be extracted from the manifest file (see e.g. FIG. 5A) and used by the CCCF in the content processing device to send channel setup request to the CCSF in the server (step 608) for setting up a server-to-client streaming control channel.

In one embodiment, the CCCF and the CCSF may comprise an HTTP WebSocket API configured to use the WebSocket protocol and the channel set-up information to set up a streaming control channel between the client and the server. The WebSocket connections typically use standard HTTP ports 80 and 443 so that data may easily transfer firewalls and NATs, but also other ports may be used.

The use of the WebSocket protocol has several advantages within the context of CDN and HAS, such as a low message overhead for scalability, the use of the HTTP for protocol convergence and traversal of firewalls, and possibility for tunnelling of other protocols. In another embodiment, the Session Initiation Protocol (SIP) (http://tools.ietf.org/html/rfc3261) may be used, where the client may comprise a SIP User Agent and the server is a SIP Application Server.

In yet another embodiment, the Extensible Messaging and Presence Protocol (XMPP) (http://www.ietf.org/rfc/rfc3920.txt) is used, where the client may comprise an XMPP client and the server comprises an XMPP server. Both the SIP and XMPP protocol messages may be tunnelled over a WebSocket according to draft-ibc-rtcweb-sip-websocket-00 and draft-moffitt-xmpp-over-websocket-00.

During set-up of the streaming control channel, channel parameters may be exchanged between the CCCF and CCSF (step 610). Furthermore, in order to handle messages originating from the client, the CCSF may create a dedicated channel handling process (thread) (step 612). Once the streaming control channel is established 614, the client may start the process of streaming chunks on the basis of information in the manifest file. The streaming process may be based on a HAS-type streaming protocol and start with a HTTP GET request comprising an URL associated with the first chunk chunk_k_XMbps.mp4 (step 616). Upon receiving the chunk request, the coordination proxy may determine a local reward estimate $r^l(k)$ associated with the client and uses this local reward estimate and the local reward estimates of other client devices in order to determine global quality information (step 617) and send this information over the control channel to the client. The transmission of the first chunk may be confirmed by a HTTP 200 OK response (step 618), Thereafter, the client may request a subsequent chunk chunk_k+1_YMbps.mp4 (steps 620) and the coordination proxy may calculate a local reward estimate $r^l(k+1)$ for the client and use this local reward estimate and the local reward estimates of other client devices in order to determine updated global quality information (step 621). The updated global quality information may be sent ("pushed") over the control channel to the client (step 623). Further, the client may receive the requested chunk in a response message (step 622).

Then, the CCSF in the server system may decide that it is necessary for the client to update its manifest file. For example, the CCSF may have received a message from the monitoring system that the QoS level of the streaming path has substantially changed so that a modification of the size of the play-out buffer may be desired. It therefore may send a manifest update message over the streaming control channel (not shown). In one embodiment, the update message may include an URL pointing to a new manifest file comprising new QoS information. Upon receiving the manifest file update message, the CCCF may request the new manifest file. Upon reception of the new manifest file comprising the new QoS information, the client may send the QoS information to the configuration module, which subsequently reconfigures the play-out buffer on the basis of the received QoS information. The streaming of the chunks to the client may be continued on the basis of the reconfigured play-out buffer. In the same way, the chunk request function may be reconfigured on the basis of the QoS information.

In another embodiment, instead of sending the QoS information in a manifest file to the client, (at least part of) the QoS information may be sent via the HAS control channel to the client.

In one embodiment, instead of transferring the channel set-up information in the manifest file, the channel set-up information may be pre-installed into the terminal or may be retrieved via a separate communication channel from another (network) source. In that case, when the client receives the manifest file, it triggers the streaming control channel client function to retrieve the channel set-up information in order to establish a streaming control channel as described with reference to FIG. 6 steps 608-614.

In another embodiment, the server system may be configured to stream chunks to multiple client devices, wherein each client is associated with its own streaming control channel in order to enable network-initiated, e.g. server-initiated, control as described with reference to FIGS. 6A and 6B. This way, the server system may control the streaming of chunked content to multiple client devices.

Figure 8:
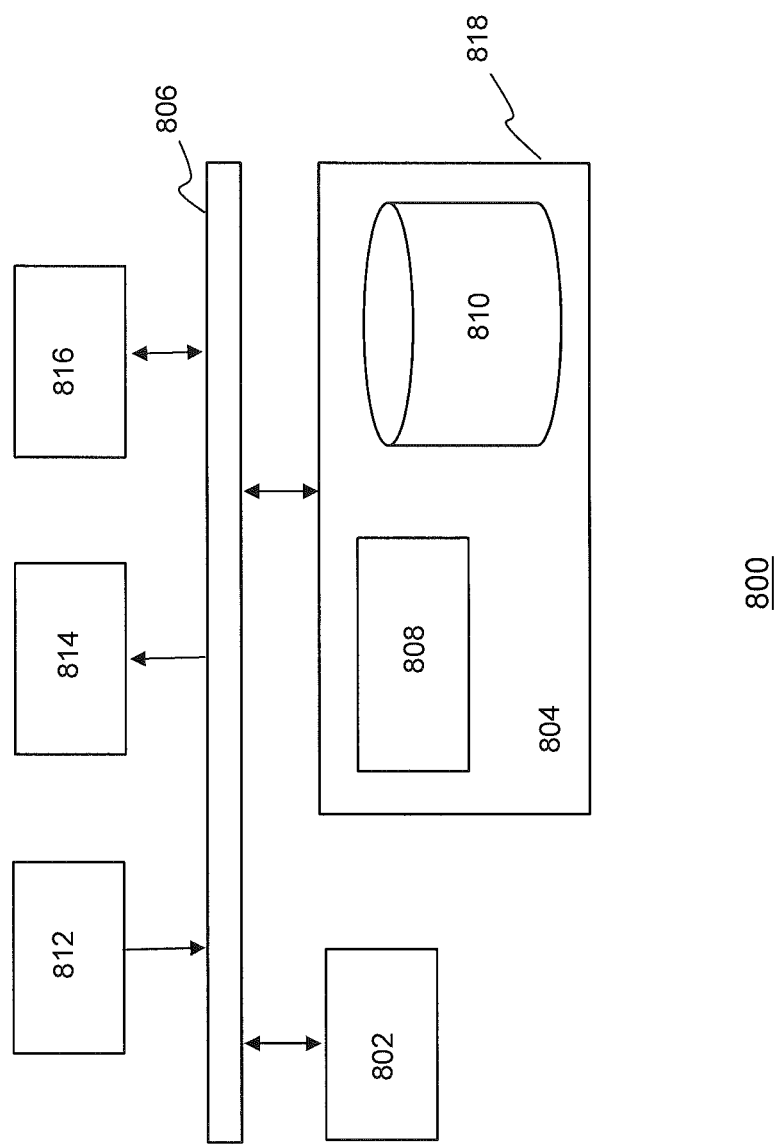
FIG. 8 is a block diagram illustrating an exemplary data processing system that may be used in systems and methods as described with reference to FIG. 1-7.

FIG. 8 is a block diagram illustrating an exemplary data processing system that may be used in systems and methods as described with reference to FIG. 1-7. Data processing system 800 may include at least one processor 802 coupled to memory elements 804 through a system bus 806. As such, the data processing system may store program code within memory elements 804. Further, processor 802 may execute the program code accessed from memory elements 804 via system bus 806. In one aspect, data processing system may be implemented as a computer that is suitable for storing and/or executing program code. It should be appreciated, however, that data processing system 800 may be implemented in the form of any system including a processor and memory that is capable of performing the functions described within this specification.

Memory elements 804 may include one or more physical memory devices such as, for example, local memory 808 and one or more bulk storage devices 810. Local memory may refer to random access memory or other non-persistent memory device(s) generally used during actual execution of the program code. A bulk storage device may be implemented as a hard drive or other persistent data storage device. The processing system 700 may also include one or more cache memories (not shown) that provide temporary storage of at least some program code in order to reduce the number of times program code must be retrieved from bulk storage device 810 during execution.

Input/output (I/O) devices depicted as input device 812 and output device 814 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 816 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 850.

As pictured in FIG. 8, memory elements 804 may store an application 818. It should be appreciated that data processing system 800 may further execute an operating system (not shown) that can facilitate execution of the application. Application, being implemented in the form of executable program code, can be executed by data processing system 700, e.g., by processor 802. Responsive to executing application, data processing system may be configured to perform one or more operations to be described herein in further detail.

In one aspect, for example, data processing system 800 may represent a client data processing system. In that case, application 818 may represent a client application that, when executed, configures data processing system 800 to perform the various functions described herein with reference to a "client". Examples of a client can include, but are not limited to, a personal computer, a portable computer, a mobile phone, or the like.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. Method for enabling adaptive streaming client devices to share network resources during transmission of content to said client devices, comprising:
a network node monitoring chunk request messages of client devices, said client devices being configured to select a quality level of a chunk from a plurality of selectable quality levels and to request a media server for transmission of a chunk of said selected quality level, said chunk comprising media data representing content for transmission to said client device;
determining for each of said client devices estimated local quality information using the quality level of one or more monitored chunk request messages of a client device, said local quality information being indicative of a quality level or a Quality of Experience (QoE) of rendering a plurality of chunks by said client device;
determining global quality information on the basis of said estimated local quality information of said client devices, said global quality information being indicative of an average quality level or an average QoE of rendering said content by said client devices; and,
transmitting said global quality information to at least one client device, said global quality information configured for being used by said at least one client device for selecting a quality level of one or more chunks to be requested by said client device;
wherein transmitting said global quality information to said at least one client device comprises:
inserting said global quality information in a chunk response message that is transmitted to said client device; and/or,
transmitting said global quality information over a (bi-directional) control channel to said client device;
wherein said client device is configured to:
select said quality level on the basis of said global quality information, preferably said client device using a manifest file for selecting said quality level, said manifest file defining a plurality of selectable quality levels of said content, each quality level being associated with a sequence of chunks;
request a chunk of said selected quality level on the basis of location information in said manifest file.

2. Method according to claim 1 wherein said global quality information is periodically or repeatedly determined and transmitted to said client devices.

3. Method according to claim 1, wherein said estimated local quality information comprises an average quality level of chunks requested by said client within a predetermined time period; and/or,
wherein said estimated local quality information comprises a QoE determined on the basis of an average quality level of chunks requested by said client device within a predetermined time period and the spread of the quality levels, preferably a standard deviation, of said chunks requested by said client device within said predetermined time period.

4. Method according to claim 1 wherein said inserting comprises:
inserting said global quality information in the header of said chunk response message.

5. Method according to claim 1 wherein transmitting said global quality information to said at least one client device comprises transmitting said global quality information over a Websocket control channel to said client device.

6. Method for enabling adaptive streaming client devices to share network resources during transmission of content to a plurality of client devices, comprising:
at least one of said plurality of client devices transmitting one or more chunk request messages for requesting transmission of at least one chunk of a quality level to a client device, said quality level being selected by said client device from a plurality of selectable quality levels, said chunk comprising media data representing content for transmission to said client device;
receiving global quality information from a network node configured for monitoring said one or more chunk request messages, said global quality information being indicative of an average quality level or an average QoE of rendering of a plurality of chunks by said plurality of client devices;
determining local quality information indicative of an average quality level or an average QoE of content rendered by said at least one client device; and,
selecting a quality level of one or more chunks on the basis of said global quality information and said local quality information;
wherein receiving said global quality information comprises:
receiving a chunk response message;
extracting said global quality information from said chunk response message that is transmitted to said client device; and/or,
receiving said global quality information over a (bi-directional) control channel to said client device;
wherein said client device is configured to:
select said quality level on the basis of said global quality information, preferably said client device using a manifest file for selecting said quality level, said manifest file defining a plurality of selectable quality levels of said content, each quality level being associated with a sequence of chunks;
request a chunk of said selected quality level on the basis of location information in said manifest file.

7. Method according to claim 6 wherein said selecting a quality level comprises:
minimizing the difference between said average quality level provided by said global quality information and said average quality level of chunks processed by said client device; or,
wherein said selecting a quality level comprises minimizing the difference between said average QoE provided by said global quality information and said average QoE associated with content rendered by said client device.

8. Method according to claim 5 wherein said extracting comprises:
extracting said global quality information from one or more data fields in the header of said chunk response message.

9. Method according to claim 6 wherein receiving said global quality information comprises receiving said global quality information over a Websocket control channel to said client device.

10. Method for enabling adaptive streaming client devices to share network resources during transmission of content to said client devices, comprising:
a network node monitoring chunk request messages of client devices, said client devices being configured to select a quality level of a chunk from a plurality of selectable quality levels and to request a media server for transmission of a chunk of said selected quality level over a data transmission path to said client devices, wherein at least part of said data transmission path is shared by at least part of said client devices;

identifying quality levels qi(k) of a chunk k (k=1, . . . , M) requested by said client devices i (i=1, . . . , N) in said monitored chunk request messages;

determining estimated local quality information $ri^f$ (k) associated with each of said client devices on the basis of a said quality levels $q_i(k)$ and one or more quality levels $q_i(k-1)$, $q_i(k-2)$, . . . of one or more earlier requested chunks, and, optionally, a maximum available quality level $q_m$ of chunk k;

determining global quality information gs(k) for said plurality of client devices on the basis said estimated local quality information $ri^f$ (k); and, transmitting said global quality information gs(k) to at least one client device, said client device being configured to select a quality level for a subsequent chunk k+1 such that the difference between said global quality information gs(k) and local quality information $r_i$ (k) determined by said client device is minimized;

wherein transmitting said global quality information to said at least one client device comprises:

inserting said global quality information in a chunk response message that is transmitted to said client device; and/or, transmitting said global quality information over a (bi-directional) control channel to said client device.

11. Method according to claim 10 wherein said estimated local quality information $ri^f$ is determined on the basis of a first reward algorithm comprising a first term stimulating selection of the highest or at least a high quality level and a second term stimulating selection of a quality level such that switches between quality levels are reduced; preferably said first reward algorithm being defined by the expression:

$$r_i^f(k) = -|q_{max} - q_i(k)| - |q_i(k) - q_i(k-1)|$$

wherein $q_{max}$ represents a maximum available quality level of a chunk.

12. Network node for enabling a plurality of adaptive streaming client devices to share network resources during transmission of content to said client devices, said network node comprising a computer readable storage medium having computer readable program code associated with a media client embodied therewith, and a processor, preferably a microprocessor, coupled to the computer readable storage medium, wherein responsive to executing the computer readable program code, the processor is configured to perform executable operations comprising:

monitoring chunk request messages of client devices, said client devices being configured to select a quality level of a chunk from a plurality of selectable quality levels and to request a media server for transmission of a chunk of said selected quality level, said chunk comprising media data representing content for transmission to said client device;

determining for each of said client devices estimated local quality information using the quality level of one or more monitored chunk request messages of a client device, said local quality information being indicative of a quality level or a Quality of Experience (QoE) of rendering a plurality of chunks by said client device;

determining global quality information on the basis of said estimated local quality information of said client devices, said global quality information being indicative of an average quality level or an average QoE of rendering said content by said client devices; and, transmitting said global quality information to at least one client device, said global quality information configured for being used by said at least one client device for selecting a quality level of one or more chunks to be requested by said client device;

wherein transmitting said global quality information to said at least one client device comprises:

inserting said global quality information in a chunk response message that is transmitted to said client device; and/or, transmitting said global quality information over a (bi-directional) control channel to said client device;

wherein said client device is configured to:

select said quality level on the basis of said global quality information, preferably said client device using a manifest file for selecting said quality level, said manifest file defining a plurality of selectable quality levels of said content, each quality level being associated with a sequence of chunks;

request a chunk of said selected quality level on the basis of location information in said manifest file.

13. An adaptive streaming client device configured to share network resources with a plurality of client devices during transmission of content to said client device and said plurality of client devices, said client device comprising: a computer readable storage medium having computer readable program code associated with a media client embodied therewith, and a processor, preferably a microprocessor, coupled to the computer readable storage medium, wherein responsive to executing the computer readable program code, the processor is configured to perform executable operations comprising:

sending one or more chunk requests messages for requesting transmission of at least one chunk of a quality level to said client device, said quality level being selected from a plurality of selectable quality levels, said chunk comprising media data representing content for transmission to said client device;

receiving global quality information from a network node, said global quality information being indicative of an average quality level or an average QoE of content rendered by said plurality of client devices;

determining local quality information indicative of an average quality level or an average QoE of content rendered by said at least one client device; and, selecting a quality level of one or more chunks on the basis of said global quality information and said local quality information;

wherein receiving said global quality information comprises:

receiving a chunk response message;

extracting said global quality information from said chunk response message that is transmitted to said client device; and/or, receiving said global quality information over a (bi-directional) control channel to said client device;

wherein said client device is configured to:

select said quality level on the basis of said global quality information, preferably said client device using a manifest file for selecting said quality level, said manifest file defining a plurality of selectable quality levels of said content, each quality level being associated with a sequence of chunks;

request a chunk of said selected quality level on the basis of location information in said manifest file.

14. Client device according to claim 13 wherein said selecting a quality level comprises:
- minimizing the difference between said average quality level provided by said global quality information and said average quality level of chunks processed by said client device; or,
- wherein said selecting a quality level comprises minimizing the difference between said average QoE provided by said global quality information and said average QoE associated with content rendered by said client device.

15. Client device according to claim 13 wherein said local quality information is determined by said client device on the basis of a second reward function, said second reward function comprising a first term for configuring the client device to select the highest or a high quality level and said second reward function comprising a second term for configuring the client device to select a quality level such that switches between quality levels are reduced; and, optionally, said second reward function comprising a third term for configuring the client device to keep a buffer of a video player at a filling level such that artefacts, preferably video freezes, are reduced during rendering of media data of requested chunks, preferably said second reward function being defined by the expression:

$$r_i(k) = -|q_{max} - q_i(k)| - |q_i(k) - q_i(k-1)| + -|b_{max} - b_i(k)|$$

wherein $q_{max}$ represents a maximum available quality level of the requested chunk, $q_i(k)$ represents the quality level of the requested chunk $q_i(k-1)$ represents the quality level of at least on earlier requested chunk, $b_i(k)$ represents the video player buffer filling level when chunk k is received and $b_{max}$ the buffer saturation level.

16. Client device according to claim 15 wherein said selecting a quality level is based on a quality level selection function comprising:
- a first function that is identical or similar to the reward function $r_i(k)$ according to claim 15; and,
- a second function that reaches an extremum when local quality information matches said global quality information, preferably said quality level selection function being given by the expression:

$$r_i^{he}(k) = r_i(k) - \alpha \max(r_i^f(k) - gs(k), 0) + -\beta \max(gs(k) - r_i^f(k), 0)$$

* * * * *